US012474900B2

(12) United States Patent
Fong et al.

(10) Patent No.: US 12,474,900 B2
(45) Date of Patent: Nov. 18, 2025

(54) INTERFACE ELEMENT CONFIGURATION AND MANAGEMENT FOR APPLICATION PLATFORMS

(71) Applicant: ServiceNow, Inc., Santa Clara, CA (US)

(72) Inventors: Wai Loon Fong, Santa Clara, CA (US); Jacqueline Luis, Santa Clara, CA (US); Andrea Perry, Santa Clara, CA (US); Angelo Calub, Santa Clara, CA (US); David Robert Leonard, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 166 days.

(21) Appl. No.: 18/463,449

(22) Filed: Sep. 8, 2023

(65) Prior Publication Data
US 2025/0085937 A1    Mar. 13, 2025

(51) Int. Cl.
*G06F 8/38*    (2018.01)

(52) U.S. Cl.
CPC ..................... *G06F 8/38* (2013.01)

(58) Field of Classification Search
None
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

ServiceNow, Utah Now Platform User Interface, May 19, 2023.
Web Content Accessibility Guidelines (WCAG) 2.1, W3C Recommendation Jun. 5, 2018.

*Primary Examiner* — Toan H Vu
(74) *Attorney, Agent, or Firm* — McDonnell Boehnen Hulbert & Berghoff LLP

(57) ABSTRACT

The present disclosure relates to a method, medium and system for receiving a request to customize display of an application, wherein the request specifies a first component characteristic associated with a first user interface component the application. The disclosure further includes identifying, based on the first component, a second component characteristic associated with a second user interface component of the application, and updating, based on a spatial or hierarchical relationship between the first user interface component and the second user interface component, the second user interface component characteristic so that the second user interface component characteristic has at least a predefined contrast ratio with the first user interface component.

20 Claims, 9 Drawing Sheets

(56) References Cited

U.S. PATENT DOCUMENTS

| | | |
|---|---|---|
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,319,116 B1 | 6/2019 | Prannoy |
| 10,607,567 B1 * | 3/2020 | Schritter .................. G09G 5/06 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2014/0379490 A1 * | 12/2014 | Schnabl ............. G06Q 30/0244 705/14.71 |
| 2016/0196584 A1 * | 7/2016 | Franklin ............ G06Q 30/0269 715/745 |
| 2018/0123940 A1 | 5/2018 | Rimar |
| 2019/0005016 A1 | 1/2019 | Hamlin |
| 2019/0073257 A1 | 3/2019 | Dasgupta |
| 2019/0104398 A1 | 4/2019 | Owen |
| 2020/0028753 A1 * | 1/2020 | Powar ..................... G07F 9/001 |
| 2020/0050689 A1 | 2/2020 | Tal |
| 2020/0204443 A1 | 6/2020 | Bar Oz |
| 2020/0301678 A1 | 9/2020 | Burman |
| 2021/0194764 A1 | 6/2021 | Badyan |
| 2022/0029886 A1 | 1/2022 | Hameiri |
| 2022/0121344 A1 * | 4/2022 | Pastrana Vicente .... G06F 3/013 |
| 2022/0319075 A1 * | 10/2022 | Hu ......................... H04L 51/10 |
| 2023/0254449 A1 * | 8/2023 | Shirai .................. G06Q 30/015 715/757 |
| 2023/0305688 A1 * | 9/2023 | Triverio ............. G06F 3/04842 |
| 2024/0184860 A1 * | 6/2024 | Brodowicz ............... H04L 9/50 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

INTERFACE ELEMENT CONFIGURATION AND MANAGEMENT FOR APPLICATION PLATFORMS

BACKGROUND

Enterprise clients may utilize multi-service computing platforms to provide standardized services and applications to multiple users across a managed network. In operation, configuring a multi-service computing platform is a time-consuming process, including performing multiple tasks in order to implement numerous subjective decisions across the services and applications available to the computing network. In addition to being a complex and time intensive process, the configuration of the multi-service computing platform may render one or more services or applications visually inaccessible to users based on the specific implementation of the subjective decisions, thus wasting computing resources, such as processing power and memory space.

SUMMARY

The present disclosure relates to systems and tools for managing deployable network resources. Deployable network resources such as an application platform and associated software may be accessible to a user in communication with a managed network. The application platform may be configured and customized to address both the user's operational requirements and guidelines.

The present disclosure relates to a theme builder for implementation across one or more managed networks allowing for the customization of network resources available to a managed network. A first example embodiment may involve a method including obtaining a theme specification that defines visual relationships between a plurality of user interface elements, receiving a request to customize display of a first user interface element of the plurality of user interface elements, wherein the request specifies a first component characteristic associated with the first user interface element, identifying, based on the first component, a second component characteristic associated with a second user interface element of the plurality of user interface elements; and updating, based on the theme specification and a relationship between the first user interface element and the second user interface element, the second user interface component characteristic.

In one example embodiment, the theme specification is received from a client device. In one example embodiment, the client device is in communication with a managed network. In one example embodiment, the relationship between the first user interface element and the second user interface element is based on a contrast ratio. In one example embodiment, the relationship between the first user interface element and the second user interface element is based on a chromaticity ratio. In one example embodiment, the relationship between the first user interface element and the second user interface element is based on a spatial relationship. In one example embodiment, the relationship between the first user interface element and the second user interface element is based on a hierarchical relationship. In one example embodiment, identifying a second component characteristic includes maintaining a contrast ratio relative to the first component characteristic. In one example embodiment, identifying the second component characteristic includes identifying a group associated with the first user interface component. In one example embodiment, the theme specification includes a visual presentation schema as applied to at least one hierarchical relationship. In one example embodiment, the request specifies an initial color identified by a user. In one example embodiment, the request includes one or more logos or color samples associated with an entity. In one example embodiment, the initial color is derived based on the one or more logos or color samples.

A second example embodiment includes a non-transitory computer-readable medium, having stored thereon program instructions that, upon execution by a computing system, cause the computing system to perform operations. The operations include obtaining a theme specification that defines visual relationships between a plurality of user interface elements, receiving a request to customize display of a first user interface element of the plurality of user interface elements, wherein the request specifies a first component characteristic associated with a first user interface element, identifying, based on the first component, a second component characteristic associated with a second user interface element of the plurality of user interface elements, and updating, based on the theme specification and a relationship between the first user interface element and the second user interface element, the second user interface component characteristic.

In one example embodiment, the theme specification is received from a client device. In one example embodiment, the client device is in communication with a managed network. In one example embodiment, the first component characteristic relates to a color presented as part of a visual presentation schema. In one example embodiment, the request includes one or more logos or color samples associated with an entity. In one example embodiment, the initial color is derived based on the one or more logos or color samples.

A second example embodiment includes a system having one or more processors, and memory, containing program instructions that, upon execution by the one or more processors, cause the system to obtain a theme specification that defines visual relationships between a plurality of user interface elements, receive a request to customize display of a first user interface element of the plurality of user interface elements, wherein the request specifies a first component characteristic associated with the first user interface element, identify, based on the first component, a second component characteristic associated with a second user interface element of the plurality of user interface elements, and update, based on the theme specification and relationship between the first user interface element and the second user interface element, the second user interface component characteristic.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
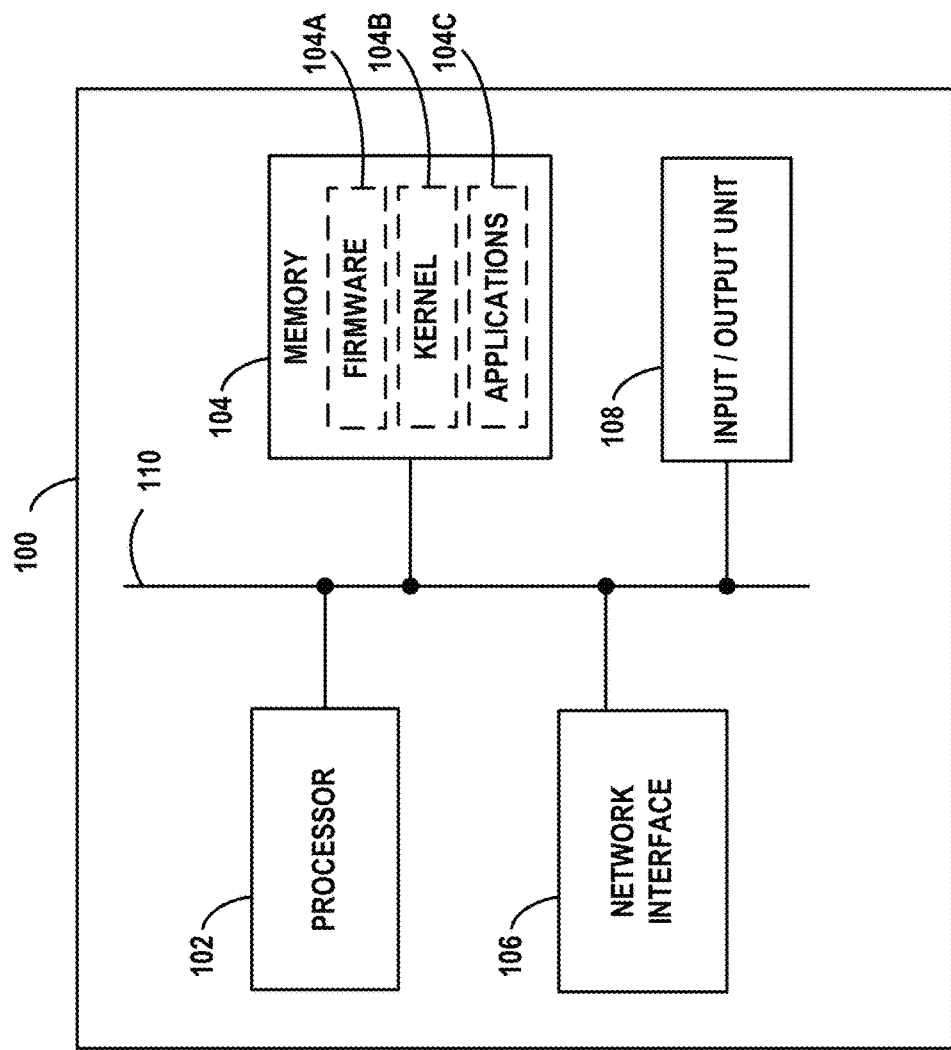
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these operations are conducted by different entities established with the enterprise, such as human resources (HR), supply chain, information technology (IT), and finance. The entities may operate individually or in concert with other entities to provide unique operations that include essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These software applications range from simple spreadsheets to custom-built software tools and databases. But the proliferation of siloed custom software applications has numerous disadvantages. For example this isolation and lack of communication between departments negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support graphical user interface tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a graphical user interface of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a graphical user interface in various ways. For example, a server device of the aPaaS system may generate a representation of a graphical user interface using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a graphical user interface may take other forms, such as an intermediate form (e.g., JAVA® byte-code) that a client device can use to directly generate graphical output therefrom. Other possibilities exist.

Further, user interaction with graphical user interface elements, such as buttons, menus, tabs, sliders, checkboxes, toggles, etc. may be referred to as "selection", "activation", or "actuation" thereof. These terms may be used regardless of whether the graphical user interface elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wi-Fi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
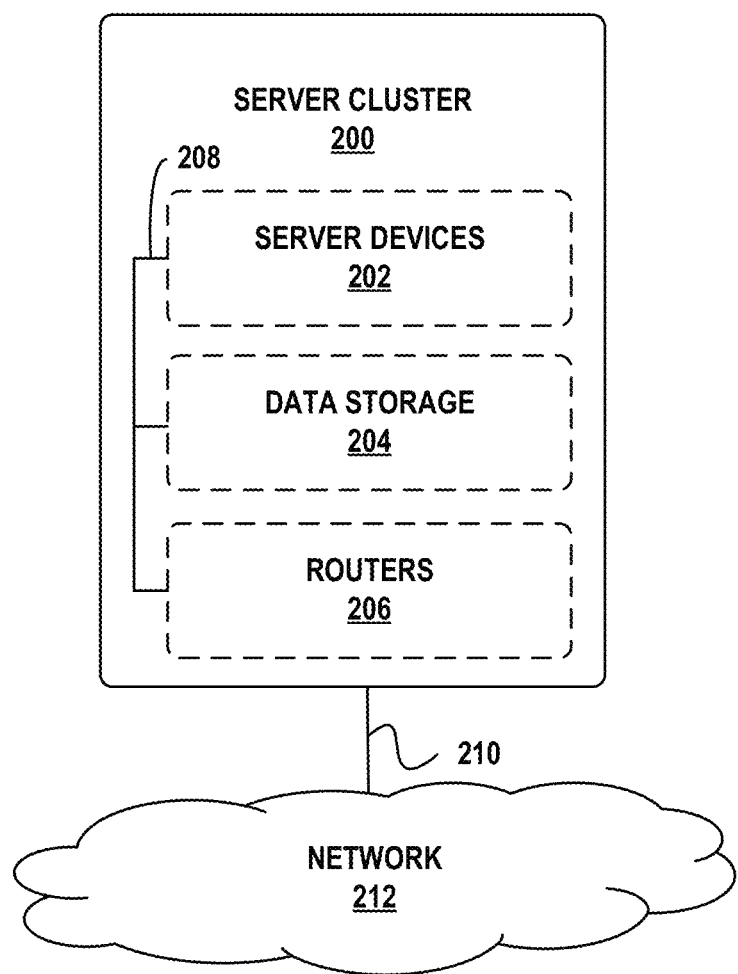
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
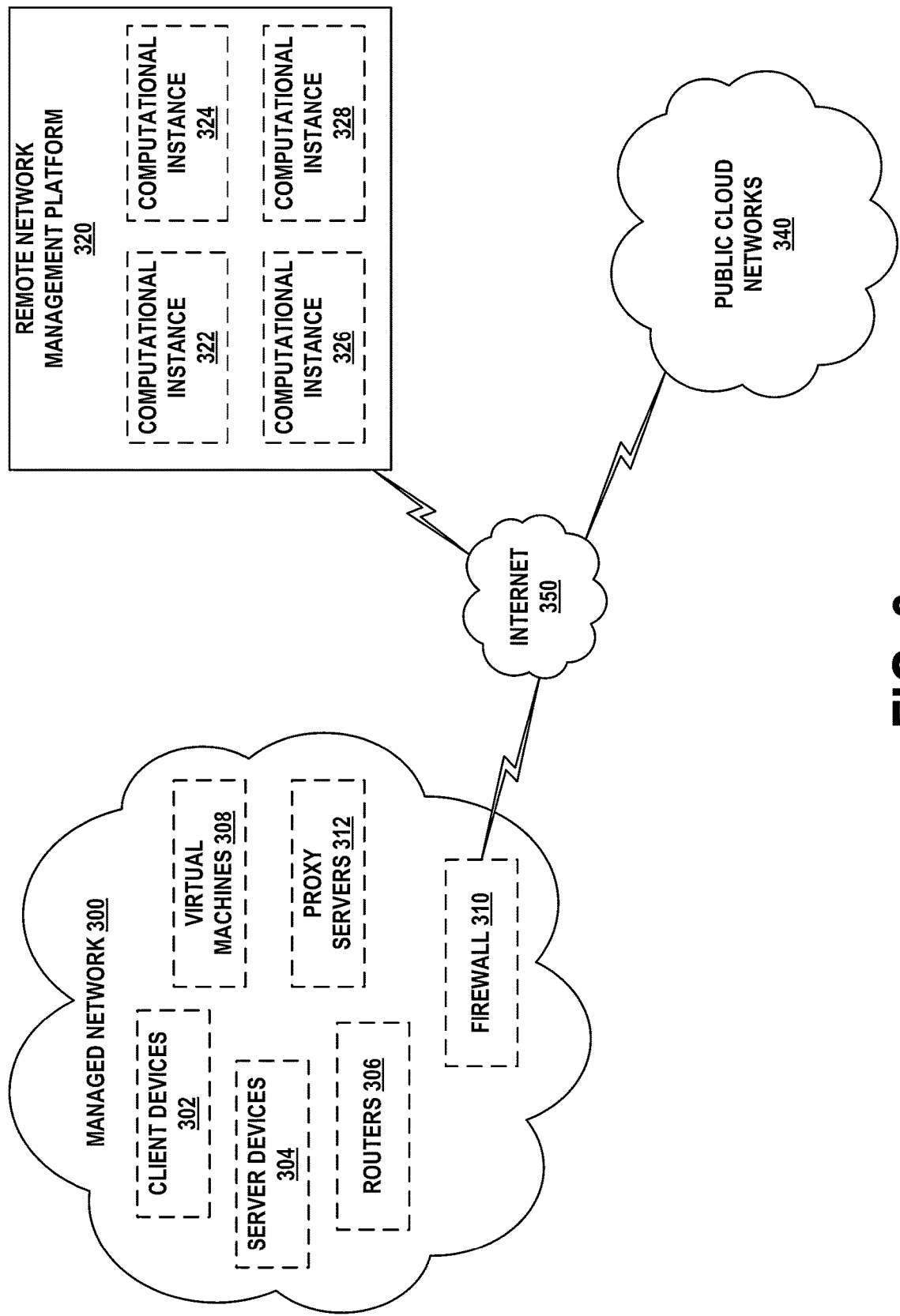
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
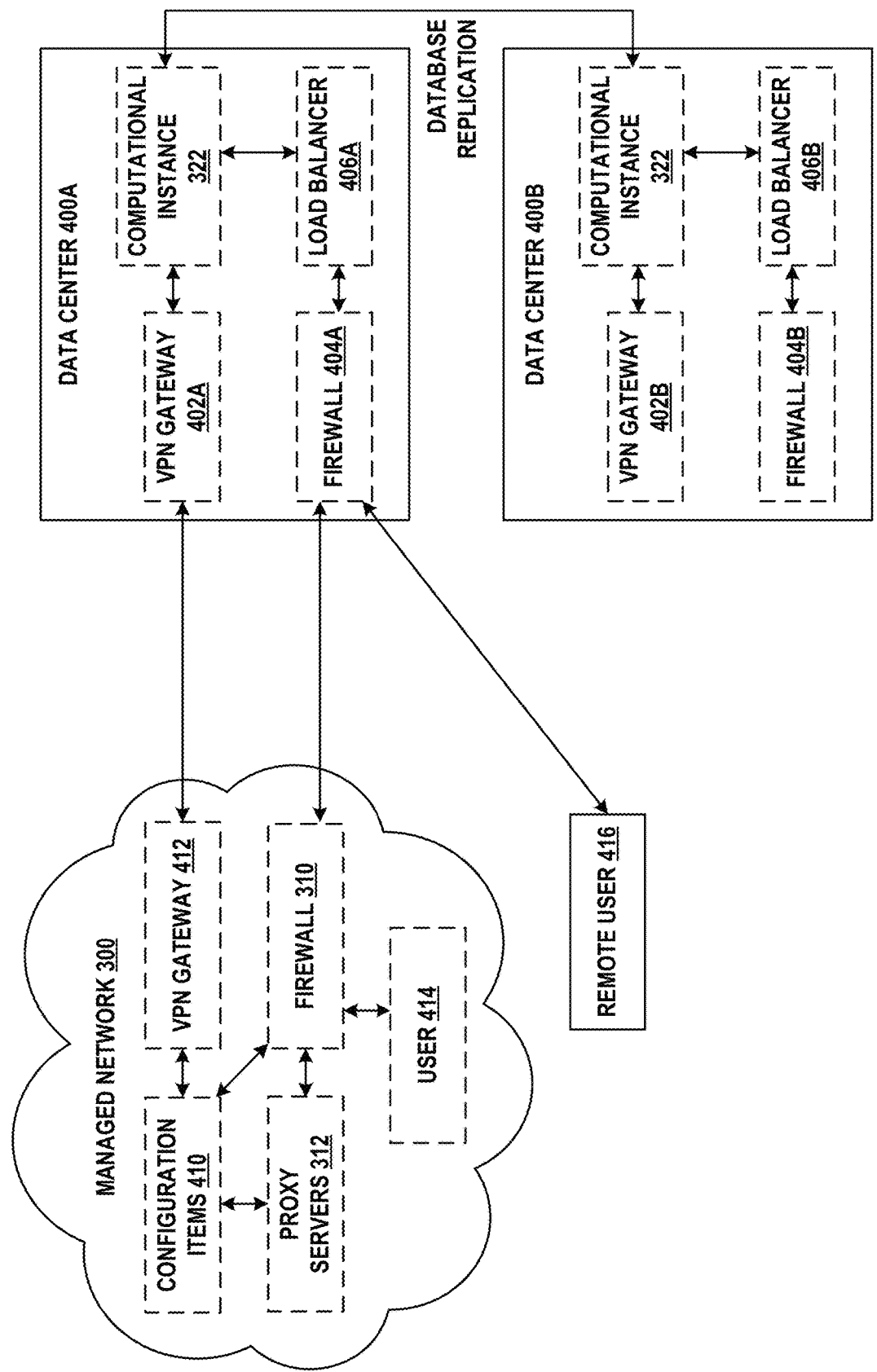
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
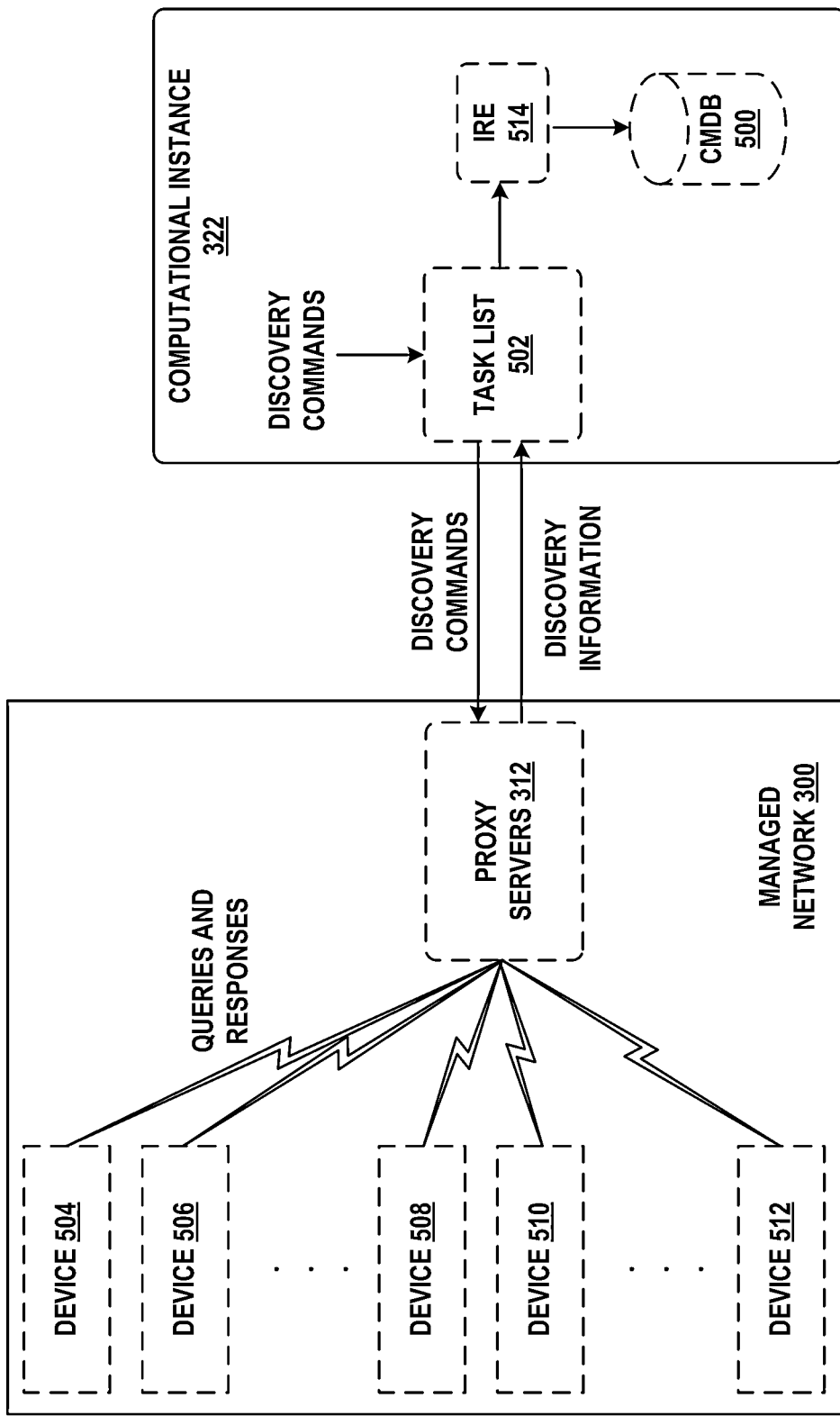
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, TRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Interface Element Configuration and Management

Figure 6:
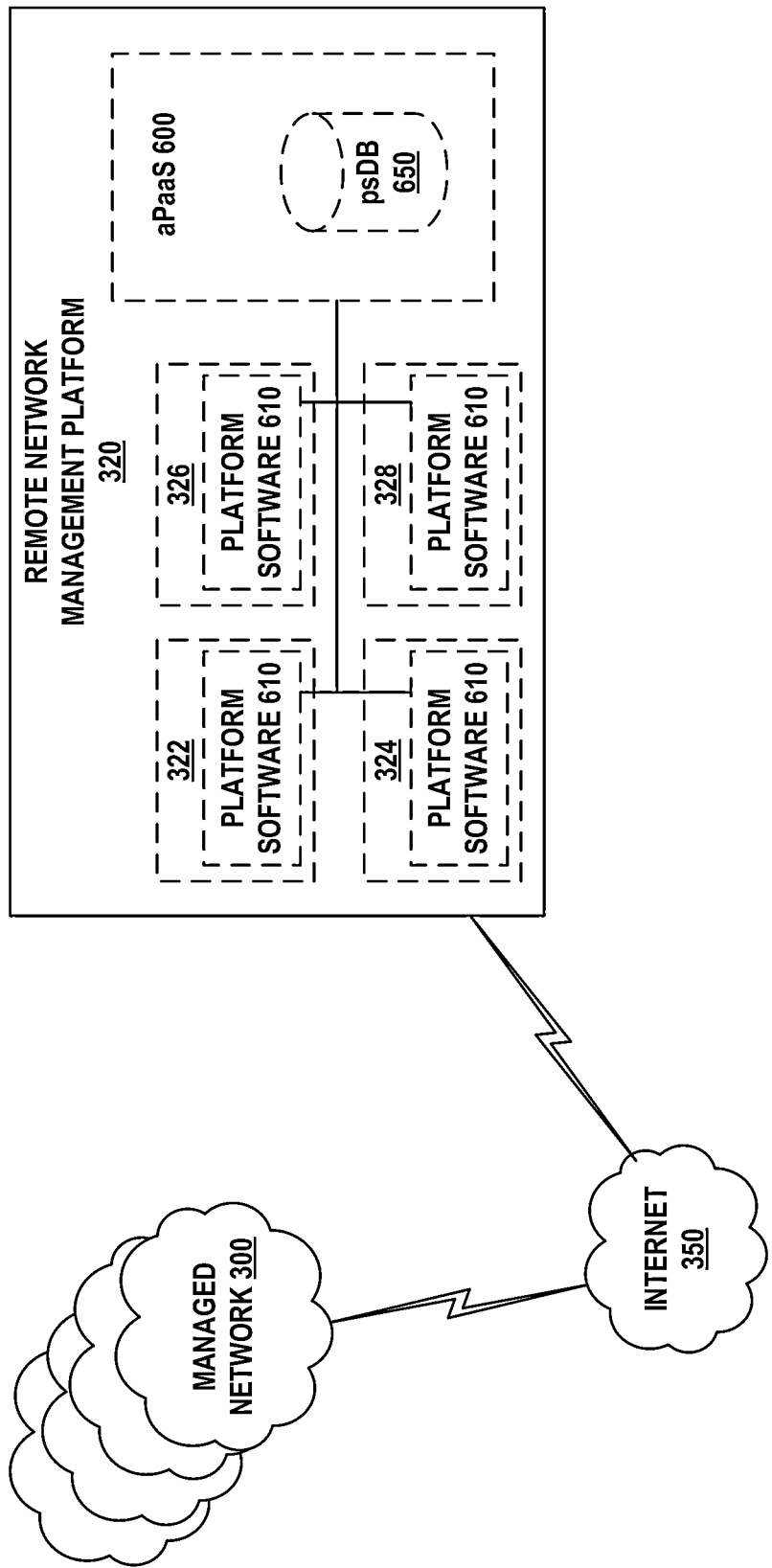
FIG. 6 depicts an application platform available to one or more managed networks, in accordance with example embodiments.

FIG. 6 illustrates an example aPaaS system 600 that may be implemented as part of the remote network management platform 320. As previously described, the example aPaaS system 600 may be configured to provide a copy of platform software 610 to one or more computational instances 322, 324, 326, and 328 associated with one or more managed networks 300. Each computational instances 322, 324, 326, and 328 may provide a copy of the platform software 610 to a different entity associated with each of the managed networks 300. The platform software 610 may include applications, application components that integrate a standardized set of widgets, tools, and functionality implemented to provide the features executable as part of the applications, and the application components. For example, the applications, and application components may include interface elements configurable as part of a graphical user interface to provide commonality across the applications, and application components of the platform software 610. The platform software 610 may further include standardized functionality and controls, predefined tasks and workflows, and data storage and management tools that may be customized and utilized by the entities.

The platform software 610 may support the design and development of new applications based on provided application, application components and standardized functionality. Similarly, the platform software 610 may support the customization and configuration of the existing standardized functionality implemented as part of the application and application components to address new tasks and process requirements. In addition to the standardized functionality, the platform software 610 and graphical user interface may further be customized to incorporate a look and feel based on an entity's custom logos and/or color schemes.

The example aPaaS system 600 may include a platform software database (psDB) 650 configured to store information related to the platform software 610. For example, the psDB 650 may store information related to the standardized set of widgets, tools, and functionality implemented to provide the features executable as part of the applications, and the application components. The psDB 650 may store information related to interface elements utilized to generate the application, application components and functionality provided by the platform software 610. The interface elements stored within the psDB 650 may be organized in a hierarchical arrangement including interface elements related to controls or navigation in one group or level one (1), interface elements related to application output to a second group or level two (2), and so on for each logical and/or operational arrangement of interface elements.

The interface elements stored within the psDB 650 may be defined by one or more platform items that specify and describe component characteristics of the interface elements. For example, the platform items may describe how each of the interface items is displayed within the graphical user interface. In another example, the platform items may describe where each of the interface items is displayed within the graphical user interface. In yet another example, the platform items may describe functionality associated with each of the interface items is displayed within the graphical user interface. The functionality described by the platform items stored in the psDB 650 may, for example, include a storage location of executable code, and ranges of values for consideration when implementing the functionality.

In one example, a plurality of platform items may be arranged and stored within the psDB 650 as a hierarchal structure of elements that reflect, for example, relationships between specific values and functionality, relationships between platform items, relationships between stored information, and a state or status of the platform items. In some embodiments, the platform items related to, for example, specific predefined functionality may be customized accordingly the client requirements associated with one of the managed networks 300. In practice, customization of the platform items related to, for example, customer relationship management (CRM) functionality may prevent alteration to core functionality or other operational aspects of the stored applications while allowing access to the configuration and relationship management of customer information and/or the state or status information related to the CRM functionality. For example, the platform items such as data fields and data tables managed as part of the CRM functionality may be customized and modified based on the client's requirements without affecting, for example, certain tracking and contact features implemented as part of the CRM core functionality of the platform software 610.

Continuing the previous CRM example, in some embodiments, the interface elements and the platform items stored in the psDB 650 relating to the generation and display of a graphical user interface as part of the CRM functionality may be identified for customization related to the display and format of customer information, the placement of information within an interface window, the organization of the interface windows with the graphical user interface, and other definable characteristics of the graphical user interface. Similarly, interface elements and platform items related to the generation and display of graphical user interfaces for each of the remaining applications, application components and functionality of the platform software 610 may be organized and accessible through the psDB 650. In this way, the psDB 650 provides access to the information, settings, and characteristics available to customize the applications, application components and functionality available through the platform software 610. It will be understood that the interface elements stored as part of the platform software 610 encompass a large number of platform items which may be used to define the graphical user interface for presenting application functionality to the user. The platform items across the application, application components, and other functionality may be arranged or groups in a hierarchal fashion that reflects common component characteristics identified between platform items. For example, the hierarchy may be configured to identify specific functionality, relationships between platform items, relationships between stored information, groups of interface elements related to graphical user interface features, and a state or status of the platform items.

In some examples, the implementation of the same hierarchy and the hierarchical relationships between different applications implemented across the platform software 610 ensures that related platform items and interface elements are treated and represented the same across the example aPaaS system 600. For example, groups or classes of platform items may be globally accessed as part of the hierarchy and/or the hierarchical relationships to which they have been identified. In this way, the psDB 650 provides access to and control over the platform items utilized to generate the graphical user interface associated with the platform software 610 and individual application, application components and functionality. Direct access and control of the platform items within psDB 650 allows for detailed control over the display and generation of interface elements and components within the graphical user interface of platform software 610. Without the implementation of the hierarchy and/or the hierarchical relationships between the interface elements stored within an psDB 650, the volume of changes necessary to customize the graphical user interface associated with platform software 610 makes the process of incorporating a theme or other customization time-consuming. Implementation of the hierarchy and/or the hierarchical relationships allows changes to be made globally based on the groups, classes, and items identified within the psDB 650.

Figure 7:
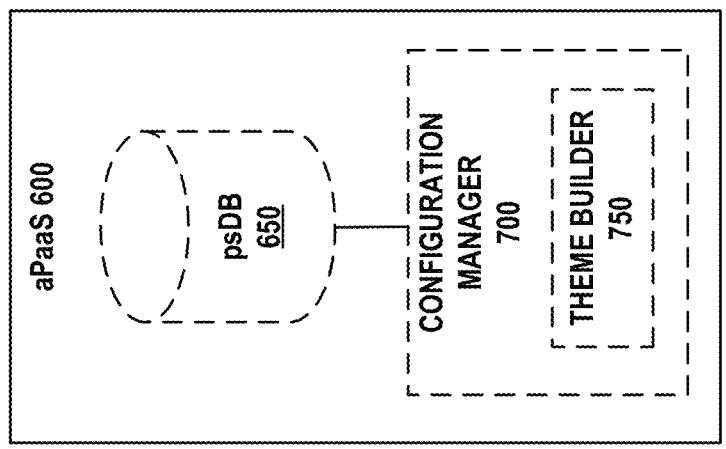
FIG. 7 illustrates a schematic drawing of the application platform including a configuration manager, in accordance with example embodiments.

FIG. 7 illustrates the example aPaaS system 600 including the psDB 650 and a configuration manager 700 adapted to accelerate the customization of the platform items and interface elements stored as part of the psDB 650. The configuration manager 700 may be implemented to streamline the customization process across the applications, application components and the graphical user interface associated with platform software 610. The configuration manager 700 may further be configured to implement accessibility standards and/or ensure compliance with accessibility standards during the customization process. For example, the configuration manager 700 may define standards derived by the client, in compliance with Web Content Accessibility Guidelines (WCAG) and other web accessibility initiatives and guidelines, to ensure that the customization to the platform software 610 do not adversely affect usability for the users of the aPaaS system 600.

Web content accessibility guidelines and the standards articulated for compliance may be implemented by the configuration manager include mechanisms to ensure the graphical user interface provides content that is perceivable, operable, and understandable by the widest array of users. In some example embodiments, the configuration manager may implement guidelines to ensure that the content is perceivable to a range of users by configuring the graphical user interface to: provide text alternatives for non-text content, provide captions and other alternatives for multimedia, incorporate assistive technologies, and provide users with content that is easy to experience both visually and audibly. The configuration manager may further implement guidelines to maintain the operability of the content by configuring the graphical user interface to: ensure access to content and functionality by way of a keyboard, display content for a sufficient period to allow a user read and utilize the content, ensure that the displayed content does not cause seizures or physical reactions, and maintain readily available navigation controls to provide access to the content. Similarly, the configuration manager may implement guidelines to ensure that content is readable and appears in predictable ways while maintaining compatibility with current and future user tools. In this way, the configuration manager may validate the accessibility and customization of the platform software 610 in order to maintain the overall usability of the applications, and application components comprising the aPaaS system 600.

Example web content accessibility guidelines that may be implemented by the configuration manager 700 to ensure the readability of content include maintaining contrast levels associated with the content displayed within the graphical user interface. For example, the configuration manager 700 may implement a visual presentation schema that includes identifying platform items and interface elements according to their contrast sensitivity. One example of a visual presentation schema is described in connection with the Web Content Accessibility Guidelines (WCAG 2.2) as part of the document entitled "Understanding SC 1.4.3: Contrast (Minimum)." According to an example visual presentation schema, a first group may include interface elements least sensitive to changes in contrast ratio. For example, the first group may include large fonts and oversized text associated with headers and titles. The visual presentation schema implemented by the configuration manager 700 may associate a contrast ratio of 3:1 with the first group. The 3:1 contrast ratio is implemented for the first group because the increased size of the text decreases the user's sensitivity to lower contrasts. Accordingly, an interface element included within the first group may be formatted to reflect a lower contrast ratio without compromising the visual accessibility of the platform software 610 because of the increased size.

The visual presentation schema may further include a second group of interface elements adapted for accessibility to a wide range of users that may include visual or contrast sensitivities. For example, the second group may include standard fonts typically utilized with normal paragraph and body text. The visual presentation schema implemented by the configuration manager 700 may associate a contrast ratio of 4.5:1 with the second group. The 4.5:1 contrast ratio is implemented for the second group because the increased contrast ratio compensates for any degradation in visual acuity or sensitivity to contrast levels experienced by user's within the second group. Accordingly, an interface element included within the second group may be formatted to reflect a pronounced contrast ratio in attempt to augment the visual accessibility of the platform software 610 without increasing or altering the text size or formatting. For example, the visual presentation schema may maintain the specified contrast ratio between a background, an interface control, and text displayed within a graphical window in order to ensure the information (e.g., the text, and the interface controls) is accessible and understandable to the user.

The visual presentation schema may further include a third group of interface elements adapted for accessibility to users with a degraded visual range and potentially a low, or lower than normal, sensitivity to contrast. The visual presentation schema implemented by the configuration manager 700 may additionally associate a contrast ratio of 7:1 with the third group to further heightened the contrast ratio and provide additional compensation to users who may be experiencing color deficiency in one or more visual areas. It will be understood that the visual presentation schema may incorporate additional groups and contrast ratios based on the specific characteristics of the interface element and/or functionality within the platform software 610.

In some embodiments, the configuration manager 700 may further include a theme builder 750 configured to update the platform items and interface elements in order to customize the visual presentation of the graphical user interface an individual components of the graphical user interface as incorporated into the platform software 610. The theme builder 750 may be configured to identify each of the interface elements configurable as part of a graphical user interface and stored as accessible platform items within the psDB 650. For example, the theme builder 750 may provide tools to dynamically configure platform items and interface elements stored and managed within the psDB 650. In some examples, the theme builder 750 may be configured to identify one or more characteristic, status, or state of an interface element associated with one or more of the platform items stored within the psDB 650 allowing for groups of interface elements to be selected. In some embodiments, the theme builder 750 may be configured to group interface elements based on a hierarchy and the platform items arranged in hierarchical relationships relative to the interface elements as implemented across the application, application components, and other functionality provided as part of the platform software 610.

In one example, the theme builder 750 may identify an interface element to be configured and select each of the platform items associated with the identified interface elements and stored within the psDB 650. The theme builder 750 may identify the interface element based on a user selection, a predefined configuration order, and other learned or patterned selection criteria. The identified interface element may correspond to one of the interface elements utilized to generate and display the graphical user interface and components of the graphical user interface as provided as part of the platform software 610. The identified interface element may be further defined and described by one or more platform items. For example, the platform items may specify a style associated with the interface element, a position of the interface element within the graphical user interface, and a size or configuration of the interface element as displayed within the graphical user interface. In some examples, the style associated with the platform items may specify a control color for the interface element as displayed within the graphical user interface. Additionally, the platform items may specify a background color, a selection color, a text color, a text size, and/or a font associated with the interface element to be displayed within the graphical user interface, and other characteristics that may correspond the visual presentation schema.

The platform items associated with the identified interface elements and stored within the psDB 650 may be arranged into a layered stacking order to facilitate the application of the visual presentation schema. The stacking order established within the theme builder 750 defines presentation relationships between the platform items used to define and display each interface element within the graphical user interface. In practice, the stacking order may identify a base characteristic associated with the platform items and layer, or otherwise arrange, the other platform items relative to the base characteristic. One or more of the platform items may be associated with a defined layer and identified collectively. For example, the stacking order may reflect the manner in which the visual presentation schema is applied between a platform item defining a background color associated with an interface item and one or more platform items defining a text color, and a control color associated with the interface item. In particular, the stacking order may reflect the manner by which web content accessibility guidelines and the standards articulated for compliance are implemented across interface elements associated with the graphical user interface provided by the platform software 610.

It will be understood that as each interface element is selected via the theme builder 750, a corresponding layered stacking order may be defined for each interface element and the associated platform items. For example, each corresponding layered stacking order may identify a base characteristic associated with the associated platform items and the layer and arrange, the remaining platform items relative to the base characteristic. As the relationships are specified by the repeated arrangement of the platform items into one or more of the layers defined as part of each stacking order, the theme builder 750 may establish one or more assignment rules that describe the defined relationships. The established one or more assignment rules may, in turn, be applied across related interface elements accessible within the psDB 650. Each component within the graphical user interface may be iteratively configured to identify and organize each of the interface elements as described above. The combination of the stacking order and assignment rules provides an organized mechanism by which customizations may be propagated to each of the identified components within the graphical user interface of the platform software 610.

Figure 8:
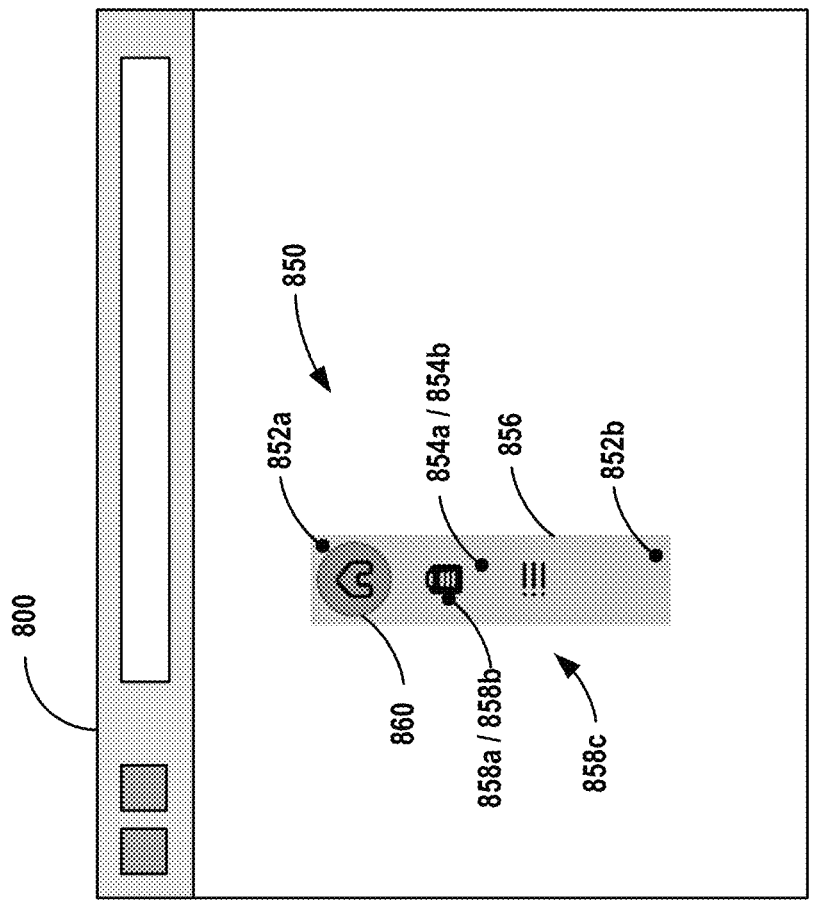
FIG. 8 depicts a webpage including a navigation component, in accordance with example embodiments.
Figure 9:
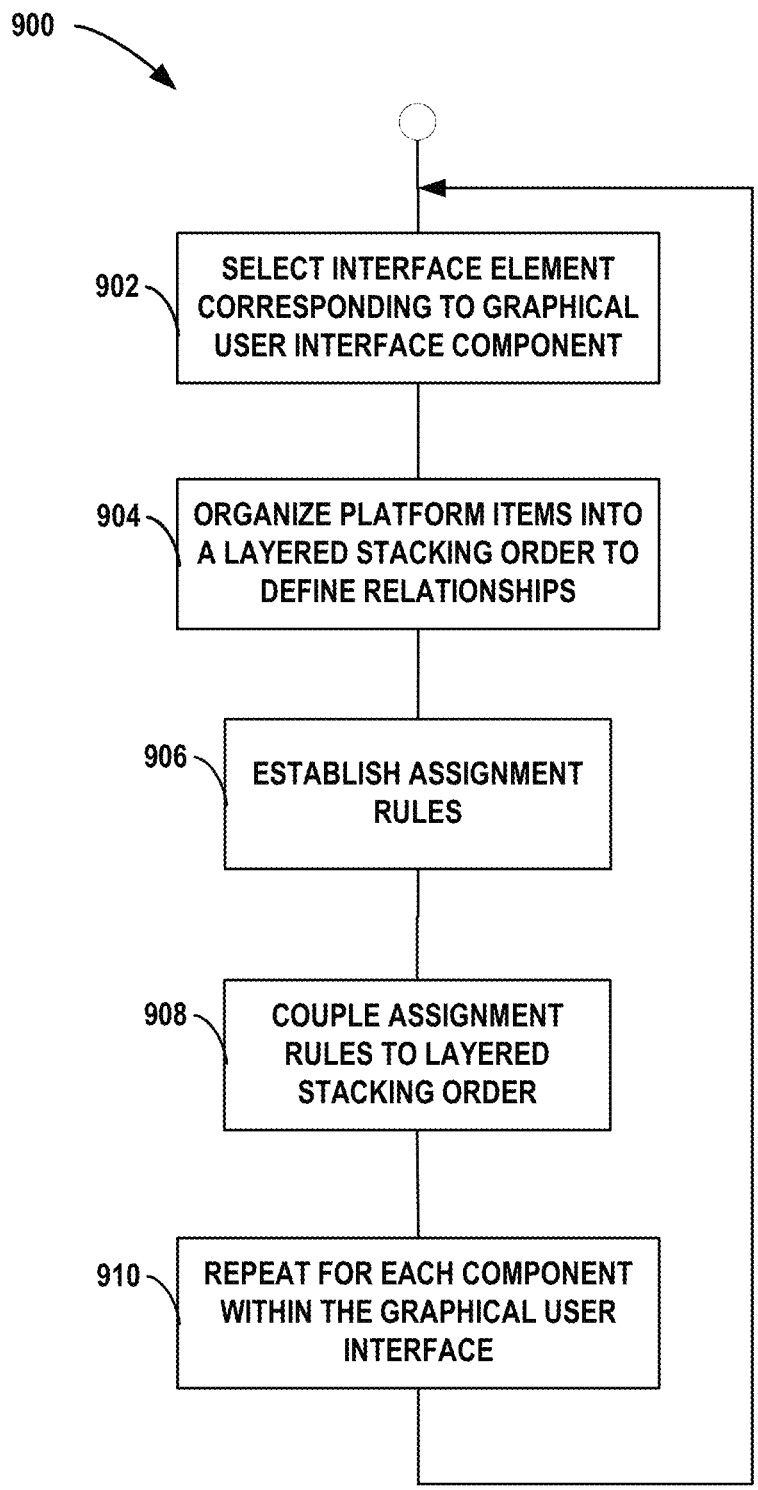
FIG. 9 is a flow chart describing a reusable color matching algorithm, in accordance with example embodiments.

FIG. 8 illustrates an example graphical user interface window 800 including a navigation component 850 that may be customized utilizing the theme builder 750. FIG. 9 is a flowchart 900 detailing the steps implemented via theme builder 750 as part of a reusable approach to characteristic mapping that may be applied to each of the components of a graphical user interface associated with the platform software 610. For example, the disclosed approach may be applied to any interface element such as the navigation component 850 that may be implemented as part of the example graphical user interface window 800. The navigation component 850 represents one of any number of standardized components that may be used to define the interface window 800 as implemented as part of the platform software 610. The navigation component 850 may be a standardized interface element available to each of the application, application components, and functionality provided by the platform software 610. Accordingly, each of example of the interface window 800 may include multiple components such as the navigation component 850 each corresponding to an interface element available as part of the psDB 650. Examples of components that may be displayed by the interface window 800 include buttons, non-editable text labels, text boxes (e.g., for text entry by a user), check boxes, radio buttons, drop-down menus or lists, list boxes with selectable list items, sliders, panels (sections of an interface that may contain other components), progress indicators (e.g., progress bars), menu bars, tool bars, tabbed controls, dialog boxes, scroll bars, image viewers (e.g., a container to display an image or icon), tooltips (e.g., a pop-up box that provides context information when hovered over or actuated), separators, and so on. Some components may serve as containers for other components (e.g., panels as noted above or list boxes containing list items). As described above, each of the components may be represented in the psDB 650 by one or more interface elements.

FIG. 9 illustrates an example of the reusable approach to characteristic mapping as a flowchart 900 implemented by the configuration manager 700 and the theme builder 750 operating in communication with the psDB 650. At step 902, one or more interface elements corresponding to, for example, the navigation component 850 may be selected and corresponding platform items within the psDB 650 may be identified. In this example, the platform items may represent hooks associated with the display and presentation of the navigation component 850. The navigation component 850 may associated with eight (8) platform items describing the state of the toolbar and canvas elements. The platform items may be:

- --now-toolbar-nav--background-color-start 852*a*;
- --now-toolbar-nav--background-color-end 852*b*;
- --now-canvas-toolbar-button--background-color-hover 854*a*;
- --now-canvas-toolbar-button--background-color-active 854*b*;
- --now-canvas-toolbar-button--border-color-active 856;
- --now-canvas-toolbar-button-color 858*a*;
- --now-canvas-toolbar-button--opacity-hover 858*b*;
- --now-canvas-toolbar-button--color-focus 858*c*.

These platform items cooperate to define and describe the interface element and how it is presented within the interface window 800. For example, the platform items 852*a* and 852*b* reflect a definition for a toolbar gradient or shading change that may be displayed as part of the navigation component 850. Similarly, the platform item 858*a*, 858*b*, and 858*c* reflect the color and characteristics display of a toolbar button within the navigation component 850 during different activity states. In some examples, the platform item 858*a* may reflect a color assigned to the toolbar button. The platform items 858*b* and 858*c* may modify the platform item 858*a* when a hover state or a focus state, respectively, is detected. In some examples, the platform item 858*a* may be associated with one layer of a stacking order and the platform items 858*b* and 858*c* may associated with at least one other layer of the stacking order.

At step 904, the identified platform items and hooks associated with navigation component 850 may be arranged into a stacking order according to their display relationship. For example, the bottom or base layer of the stacking order may correspond to the background platform items 852*a*/852*b*. Additional interface elements and/or platform items may be grouped into the same layer and implemented with a common display relationship. In this example, the background platform item 852*a* reflects a first color and the background platform item 852*b* reflects a second color which cooperate to define a gradient. The gradient may be implemented as the background of the navigation component 850. In another example, the gradient may be flattened or otherwise removed. The flattened gradient reflected as part of a base layer of the stacking order may be represented programmatically as:

```
{
    "--now-toolbar-nav--background-color-start": "" ,
    "--now-toolbar-nav--background-color-end": "",
}
```

In practice, by treating both the background platform item 852*a* corresponding to a gradient start and the background platform item 852*b* corresponding to a gradient end as having the same value, the gradient may be removed from the visual presentation the navigation component 850.

As the stacking process continues via theme builder 750, the platform item 854*a*/854*b*, 856, and 858*a* may be grouped into a common layer. In this way, the stacking order includes the background platform item 852*a*/852*b* grouped into one layer, and the platform items 854*a*/854*b*, 856, and 858*a* grouped together into the different layer. The resulting stacking order defines and reflects a display relationship between the layers. The stacked relationship may be represented programmatically as:

```
{
    "--now-toolbar-nav--background-color-start": {
        "--now-canvas-toolbar-button--background-color--hover": "",
        "--now-canvas-toolbar-button--background-color--active": "",
        "--now-canvas-toolbar-button--border-color--active": "",
        "--now-canvas-toolbar-button--color": ""
    }
}
```

In practice, the background platform item 852*a*/852*b* defines a first layer and the platform items 854*a*/854*b*, 856, and 858*a* define a second layer arranged as a child node relative to the first layer. Thus, any changes or updates applied to the first layer can be propagated to the second, child layer.

Based on the established relationship between the platform items arranged into stacked layers, a final stacking map may be represented programmatically as:

```
import {AA_GRPH} from '../core/constants';
export const levelOneMapFile = {
    '--now-toolbar-nav--background-color-start' : 'INITIAL_COLOR',
    '--now-toolbar-nav--background-color-end' : 'INITIAL_COLOR',
    '--now-canvas-toolbar-button--background-color--hover': {
        scale: '--now-color_secondary-nav--brand',
        offset: 2,
    },
    '--now-canvas-toolbar-button--background-color--active' : {
        scale: '--now-color_secondary-nav--brand' ,
        offset: 2,
    },
    '--now-canvas-toolbar-button--border-color--active': {
        scale: '--now-color_secondary-nav--brand',
        targetScale: '--now-color_secondary-nav--divider',
        offset: 4
    },
    '--now-canvas-toolbar-button--color': {
        comparison Value: '--now-color--neutral-21',
        threshold: AA_GRPH,
        pass: '--now-color--neutral-21',
        fail: '--now-color--neutral-0',
        state: {
            '--now-canvas-toolbar-button--opacity--hover' : '0.6',
                '--now-canvas-toolbar-button--color--focus': {
                    backgroundColorOverride:
        '--now-canvas-toolbar-button--background-color--active',
                    comparison Value: '--now-color--neutral-21',
                    threshold: AA_GRPH,
                    pass: '--now-color--neutral-21',
                    fail: '--now-color--neutral-0'
                }
            }
        }
    }
};
```

The resulting stacking map manages and directs the corresponding updates to the navigation component 850 when an initial color is identified. In particular, the resulting stacking map directs the actions to be taken by the configuration manager 700 when an initial color is selected via the theme builder 750.

At step 906, the reusable approach to characteristic mapping 900 continues and one or more assignment rules may be established. Assignment rules reflect the manner in which information such as a color value may be associated with one or more platform items. In some examples, one or more assignment rules may be identified for a stacking order and grouped together to establish a collection of reusable assignment rules. In operation, interface elements such as the navigation component 850 and the related platform items 852-858 may be accessed or updated using multiple types of assignment rules. An assignment rule may be implemented to ensure that an interface element displayed in black includes white text. For example, assignment rules that may be implemented to access and update information related to an interface element may include a direct assignment rule, a comparison assignment rule, and an offset assignment rule. A direct assignment rule is a type of assignment in which the assignment value is a static value. One example of a direct assignment rule may be represented programmatically as:

```
{
    "--now-toolbar-nav--background-color-start":
  "--now-color_secondary-nav--brand-2" ...
}
or
{
    "--now-toolbar-nav--background-color-start": {
        value: "--now-color_secondary-nav--brand-2"
    }
}
```

In this example, the background color associated with the navigation device 850 may be configured as a secondary color based on the previously identified initial color.

A comparison assignment rule is a type of assignment in which the assignment value is based on a comparison to a predefined threshold. One example of a comparison assignment rule may be represented programmatically as:

```
{
    "--now-canvas-toolbar-button--color": {
        comparisonValue: '--now-color--neutral-21',
        threshold: AA_GRPH,
        pass: '--now-color--neutral-21',
        fail: '--now-color--neutral-0',
    },
}
```

In this example, the platform item 858a corresponding to the toolbar-button color may be compared to the comparisonValue. The comparisonValue may reflect the predefined threshold. For example, the threshold may reflect a static value that will be compared against the contrast-ratio. In the present example, pass reflects the assignment value if the contrast ratio determined to be greater than or equal to the threshold, and fail reflects the assignment value if the contrast ratio determined to be less than the threshold.

An offset assignment rule is a type of assignment in which the assignment value is based on a value from a known color scale and a desired offset from the base index. One example of an offset assignment rule may be represented programmatically as:

```
{
    "--now-canvas-toolbar-button--background-color--hover": {
        scale: '--now-color_secondary-nav--brand',
        offset: 2,
    }
,...
```

In this example, the platform item 858b corresponding to toolbar-button opacity may configured based on a color identified as color_secondary-nav that incorporates an offset of two (2) relative to the color based on a working color scale associated with the platform software 610. For example, this static offset may be utilized to identify when the navigation component 850 is in a hover state.

Multiple assignment rules may be established for interface elements, platform items, and groups of platform items in order to manage how information such as a color value is applied to one or more of the stacking orders defined in connection with an interface element such as the navigation component 850. The assignment rules manage the manner in which, for example, the related platform items 852-858 may be accessed or updated. Similarly, the process and establishment of assignment rules may be repeated for each of the interface elements and platform items associated with the interface window 800.

At step 908, a function may be defined to couple the relationship specified as part of the stacking order established between platform items with the assignment rules and/or collection of assignment rules. For example, the function may be configured to process each permutation of stacking order for each interface element against the associated assignment rules. One example of the resulting function may be represented as:

```
// usage example
// level-one-nav/index.js
1 import {mapColors} from '../core';
2 import {levelOneMapFile} from './map';
3
4 export const getL1Hooks = (hooks) => {
5   return mapColors(
6       '--now-color_secondary-nav--brand-2',
7       hooks,
8       levelOneMapFile
9   );
10 };
```

In this way, the configuration manager 700 may utilize the relationships and mappings generated by the theme builder 750 to map colors based on an identified initial color and the derived secondary color. For example, the importing mapColors may include the identified initial color, platform items or hooks related to color, and the relationships defined as part of the stacking order. Similarly, importing levelOneMapFile may include identifying interface elements grouped as level one (1) elements within the psDB 650. The configuration manager 700 may provide the export to apply the identified initial color to the identified platform items related to color according to the relationships in the stacking order.

At step 910, the process 900 is may be repeated for some or each of the interface elements displayed within each interface window 800 of the graphical user interface provided as part of the platform software 610. In this way, some or each of the interface element and platform item maintained within the psDB 650 and associated with the visual presentation of the graphical user interface may be organized and configured for customization. In particular, by implementing the reusable approach to characteristic mapping shown in flowchart 900, the colors and appearance of the graphical user interface associated with the platform software 610 may be organized and logically updated to reflect a custom color selection associated with, for example, a logo.

Figure 10:
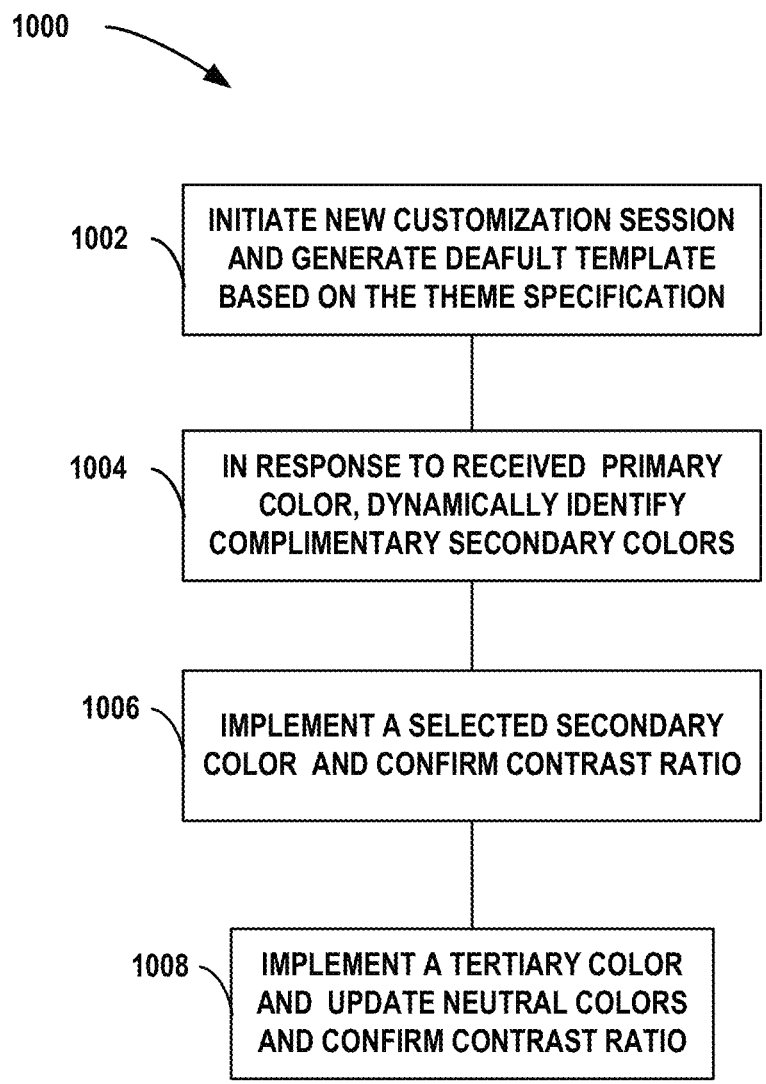
FIG. 10 is a flow chart describing a customization process implemented via theme builder, in accordance with example embodiments.

FIG. 10 is a flowchart 1000 showing the steps that may be implemented utilizing the theme builder 750 when customizing or defining a theme specification including colors, fonts, and other elements of the visual presentation of the graphical user interface associated with the platform software 610. For example, the theme specification implemented by the theme builder 750 may incorporate the visual presentation schema according to one or more web accessibility initiatives and guidelines. At step 1002, the theme builder 750 starts a new session based on a theme specification. For example, the theme specification may define a default theme implemented for the initial session. The theme specification may be provided by a client device in communication with the theme builder 750. As part of the initial session, the theme builder 750 may prompt the user to identify or provide a primary color. The new session may further include generating the default template including static or neutral colors for the initial presentation to the user. The initial color provided by the user may be directly specified as a hue, saturation, and lightness (HSL) value, red, green, and blue (RGB) values or any other color space value. In this example, the default template may specify static or default color values to one or more groups of interface elements stored within the psDB 650. For example, a primary default color value may be assigned to interface elements related to controls or navigation and identified as level one components, and a secondary default color, which may be the same as the primary default color, may be assigned to interface elements related to application output and identified as level two components. Default colors may be similarly applied to additional levels relating to other interface elements. In one example, the theme specification defines the relationships between interface elements identified as level one components and those identified as level two components.

At step 1004, in response to receiving the initial color provided by the user and isolating the corresponding color space value, the theme builder 750 may replace the primary default color defined in the theme specification with the provided initial color. For example, this provided initial color may reflect an entity's preferred color or other color identified by the user of the platform software 610. The theme builder 750 may identify the provided initial color with, for example, interface elements related to controls or navigation and identified as level one components. The theme builder 750 may utilize the provided initial color to update the level one components including both interface elements and platform items based on the assignment rules and relationships defined as part of the stacking order. In some examples, the provided initial color may be further utilized to replace the secondary default color. In this way, interface elements and the corresponding platform items may both be updated to reflect the same provided initial color.

The theme builder 750 may further utilize the provided initial color to dynamically identify one or more complimentary colors utilized as part if the theme specification. The one or more complimentary colors may be identified based on the visual presentation schema according to one or more web accessibility initiatives and guidelines. For example, based on the color space value associated with the provided initial color, the theme builder 750 may identify one or more corresponding colors that maintains a 4.5:1 contrast ratio relative to the provided initial color. The theme builder 750 may employ the corresponding colors reflecting a 4.5:1 contrast ratio to generate one or more previews of the default template. For example, each preview could include a representation of the default template updated to reflect the provided initial color and one of the corresponding colors.

At step 1006, the user may provide a secondary color based on the identified initial color. For example, the theme builder 750 may present the generated previews to user for selection of one representation of the default template based on the provided initial color and one of the generated secondary colors that satisfy the desired accessibility criteria. The theme builder 750 may further save an updated version of the theme specification including the provided and identified colors and relationships necessary for their application to one or more corresponding interface elements. The theme builder 750 may further export or provide a copy of the updated theme specification to the client device. For example, the user may directly specify a secondary color and/or provide a specific color space value such as an accent color in a logo to update theme specification. If the color is manually specified by the user, the theme builder 750 may verify that the provided color space value maintains the desired accessibility criteria such as a 4.5:1 contrast ratio relative to the provided initial color. For example, the specified secondary color may reflect a secondary color or other color identified by the user of the platform software 610. The theme builder 750 may identify the specified secondary color with, for example, interface elements related to application output and identified as level two components. In other examples, the size and format of the interface element and/or characteristics specified by the platform items may reflect different contrast ratios based on alternate accessibility criteria. The theme builder 750 may utilize the specified secondary color to update the level two components including both interface elements and platform items based on the assignment rules and relationships defined as part of the stacking order. The theme builder 750 may further confirm that each of the affected interface elements and platform items maintains an accessibility defined contrast ratio.

At step 1008, a tertiary color associated with the identified initial color and the secondary color may be defined or otherwise associated with the theme specification via the theme builder 750. For example, the tertiary color may apply to a group of interface elements corresponding to a level three component as identified within the psDB 650. In some examples, the tertiary color may reflect a neutral color implemented as part of the updated default theme including the identified initial color and the secondary color. For example, the neutral color may reflect an interface element within the graphical user interface that is displayed in a deactivated state. The theme builder 750 may further confirm that the group of interface elements corresponding to level three components maintains the accessibility defined contrast ratio. It should be understood that changes to color values provided to the theme builder 750 may result additional contrast ratio checks based on one or more components within the graphical user interface being identified as an accessibility requirement.

In other example, changes to color values provided to the theme builder 750 may result in an iterative update to propagate the changes.

In another example, the theme builder 750 may be configured to establish contrast ratios to generate a dark-mode visual presentation of the graphical user interface. This dark-mode may be maintained as a theme and stored for use across the platform software 610.

In another example, the initial color, secondary color, and/or the tertiary color may be derived automatically based on an analysis of an entity's custom logos and/or color schemes. For example, colors may be directly extracted from a logo and applied to a default theme generated by the theme builder 750. The colors identified based on the logo may, in turn, be propagated to the interface elements grouped into levels within the psDB 650.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining a theme specification for a plurality of software applications that defines visual relationships between a plurality of application components cooperating to define the plurality of software applications, and wherein the plurality of application components include a plurality of user interface elements arranged in a hierarchy relationship;
   receiving a request to customize display of a first user interface element of the plurality of user interface elements, wherein the request specifies a first component characteristic associated with the first user interface element;
   identifying, based on the first component characteristic, a second component characteristic associated with a second user interface element of the plurality of user interface elements; and
   updating, based on the theme specification and the hierarchy relationship between plurality of user interface elements including the first user interface element and the second user interface element, the second component characteristic.

2. The method of claim 1, wherein the theme specification is received from a client device.

3. The method of claim 2, wherein the client device is in communication with a managed network.

4. The method of claim 1, wherein the visual relationship between the first user interface element and the second user interface element is based on a contrast ratio.

5. The method of claim 1, wherein the visual relationship between the first user interface element and the second user interface element is based on a chromaticity ratio.

6. The method of claim 1, wherein the visual relationship between the first user interface element and the second user interface element is based on a spatial relationship.

7. The method of claim 1, wherein the visual relationship between the first user interface element and the second user interface element is based on the hierarchical relationship.

8. The method of claim 1, wherein identifying the second component characteristic includes maintaining a contrast ratio relative to the first component characteristic.

9. The method of claim 1, wherein identifying the second component characteristic includes identifying a group associated with the first component characteristic.

10. The method of claim 1, wherein the theme specification includes a visual presentation schema as applied to at least one hierarchical relationship.

11. The method of claim 1, wherein the request specifies an initial color identified by a user.

12. The method of claim 1, wherein the request includes one or more logos or color samples associated with an entity.

13. The method of claim 12, wherein an initial color is derived based on the one or more logos or color samples.

14. A non-transitory computer-readable medium, having stored thereon program instructions that, upon execution by a computing system, cause the computing system to perform operations comprising:
- obtaining a theme specification for a plurality of software applications that defines visual relationships between a plurality of application components cooperating to define the plurality of software applications, and wherein the plurality of application components include a plurality of user interface elements arranged in a hierarchy relationship;
- receiving a request to customize display of a first user interface element of the plurality of user interface elements, wherein the request specifies a first component characteristic associated with the first user interface element;
- identifying, based on the first component characteristic, a second component characteristic associated with a second user interface element of the plurality of user interface elements; and
- updating, based on the theme specification and the hierarchy relationship between plurality of user interface elements including the first user interface element and the second user interface element, the second component characteristic.

15. The non-transitory computer-readable medium of claim 14, wherein the theme specification is received from a client device.

16. The non-transitory computer-readable medium of claim 15, wherein the client device is in communication with a managed network.

17. The non-transitory computer-readable medium of claim 14, wherein the first component characteristic relates to a color presented as part of a visual presentation schema.

18. The non-transitory computer-readable medium of claim 14, wherein the request includes one or more logos or color samples associated with an entity.

19. The non-transitory computer-readable medium of claim 18, wherein an initial color is derived based on the one or more logos or color samples.

20. A system comprising:
- one or more processors; and
- memory, containing program instructions that, upon execution by the one or more processors, cause the system to perform to:
  - obtain a theme specification for a plurality of software applications that defines visual relationships between a plurality of application components cooperating to define the plurality of software applications, and wherein the plurality of application components include a plurality of user interface elements arranged in a hierarchy relationship;
  - receive a request to customize display of a first user interface element of the plurality of user interface elements, wherein the request specifies a first component characteristic associated with the first user interface element;
  - identify, based on the first component characteristic, a second component characteristic associated with a second user interface element of the plurality of user interface elements; and
  - update, based on the theme specification and the hierarchy relationship between plurality of user interface elements including the first user interface element and the second user interface element, the second component characteristic.

* * * * *